A. L. NOLF.
Cells for Galvanic Batteries.

No. 153,841.  Patented Aug. 4, 1874.

Witnesses:

Inventor:

UNITED STATES PATENT OFFICE.

ANDREW L. NOLF, OF NEW YORK, N. Y.

IMPROVEMENT IN CELLS FOR GALVANIC BATTERIES.

Specification forming part of Letters Patent No. 153,841, dated August 4, 1874; application filed March 13, 1874.

*To all whom it may concern:*

Be it known that I, ANDREW L. NOLF, of the city, county, and State of New York, have invented a new and useful Improvement in Galvanic Batteries; and I do hereby declare the following to be a full, clear, and exact description thereof, which will enable those skilled in the art to make and use the same, reference being had to the accompanying drawing, forming part of this specification, in which drawing—

Figure 1:
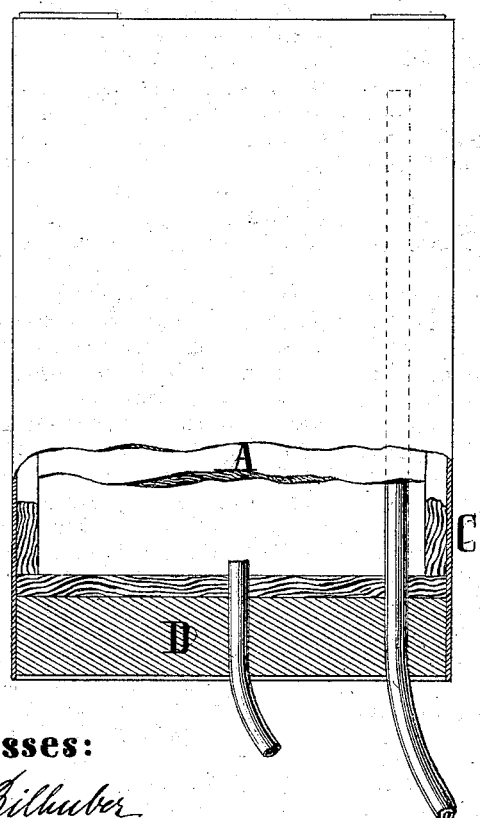
Figure 2:
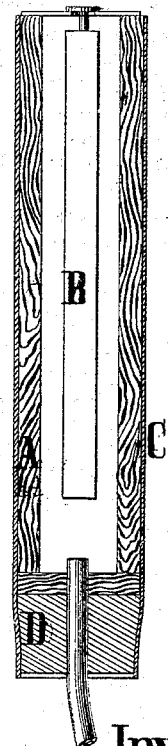

Figure 1 represents a side view of this invention. Fig. 2 is a transverse section of the same.

Similar letters indicate corresponding parts.

This invention consists in a galvanic battery, the carbon element of which is made in the form of a cup or vase, and rendered impermeable to liquid by coating it on the outside with wax and rosin, or other suitable material, in such a manner that said carbon element serves the double purpose of the vase of the battery and of its positive pole, and a simple and effective battery can be produced at a comparatively small expense. With this vase is combined a casing of india-rubber, which projects down beyond the bottom of the vase, and incloses a layer of wax or other suitable material for the purpose of protecting the carbon vase against injury.

In the drawing, the letter A designates the carbon element of my battery, which is made in the form of a vase or cup, either square, round, oval, or of any desirable shape suitable for my purpose. This carbon vase I coat on its exterior surface with a mixture of wax and rosin, or with any other suitable material which will render the same impermeable to liquid, and particularly to those liquids which are generally used in galvanic batteries—such, for instance, as a solution of bichromate of potassa.

After the carbon vase has been prepared as above described, I suspend in the same an element, B, of zinc, or other suitable material generally used in galvanic batteries, and then I charge the carbon vase with bichromate of potassa or other suitable liquid, and the battery is ready for use, the carbon vase forming the positive and the zinc element the negative pole thereof. By this arrangement I am enabled to dispense with the vase required for galvanic batteries of ordinary construction, which vase is usually made of glass, pottery, porcelain, or other fragile material, and not only increases the cost of the battery, but also the danger of breakage, and particularly the bulk or space required for the battery. By dispensing with the ordinary vase I am enabled to pack up my battery in a comparatively small bulk, and when my battery is put up for use it takes up much less room than a battery of the ordinary form and construction, while its effect is not impaired.

The mixture which I use for coating my carbon cup is, by preference, made of three parts of rosin and one part of wax.

With the carbon vase A I combine a casing, C, of india-rubber or other soft and elastic material. This casing projects beyond the bottom of the vase, and it incloses a layer, D, of wax or other suitable material, for the purpose of protecting the vase against injury from coming in contact with hard objects.

What I claim as new, and desire to secure by Letters Patent, is—

As a new article of manufacture, an outer cell of carbon for galvanic batteries, rendered impervious to moisture upon its exterior, and provided at its base with a cushion, all constructed substantially as described, for the purpose specified.

A. L. NOLF.

Witnesses:
W. HAUFF,
E. F. KASTENHUBER.